J. F. KEITH.
CRANK PIN CONNECTION FOR WELL DRILLING MACHINERY.
APPLICATION FILED MAY 19, 1909.
971,897.
Patented Oct. 4, 1910.
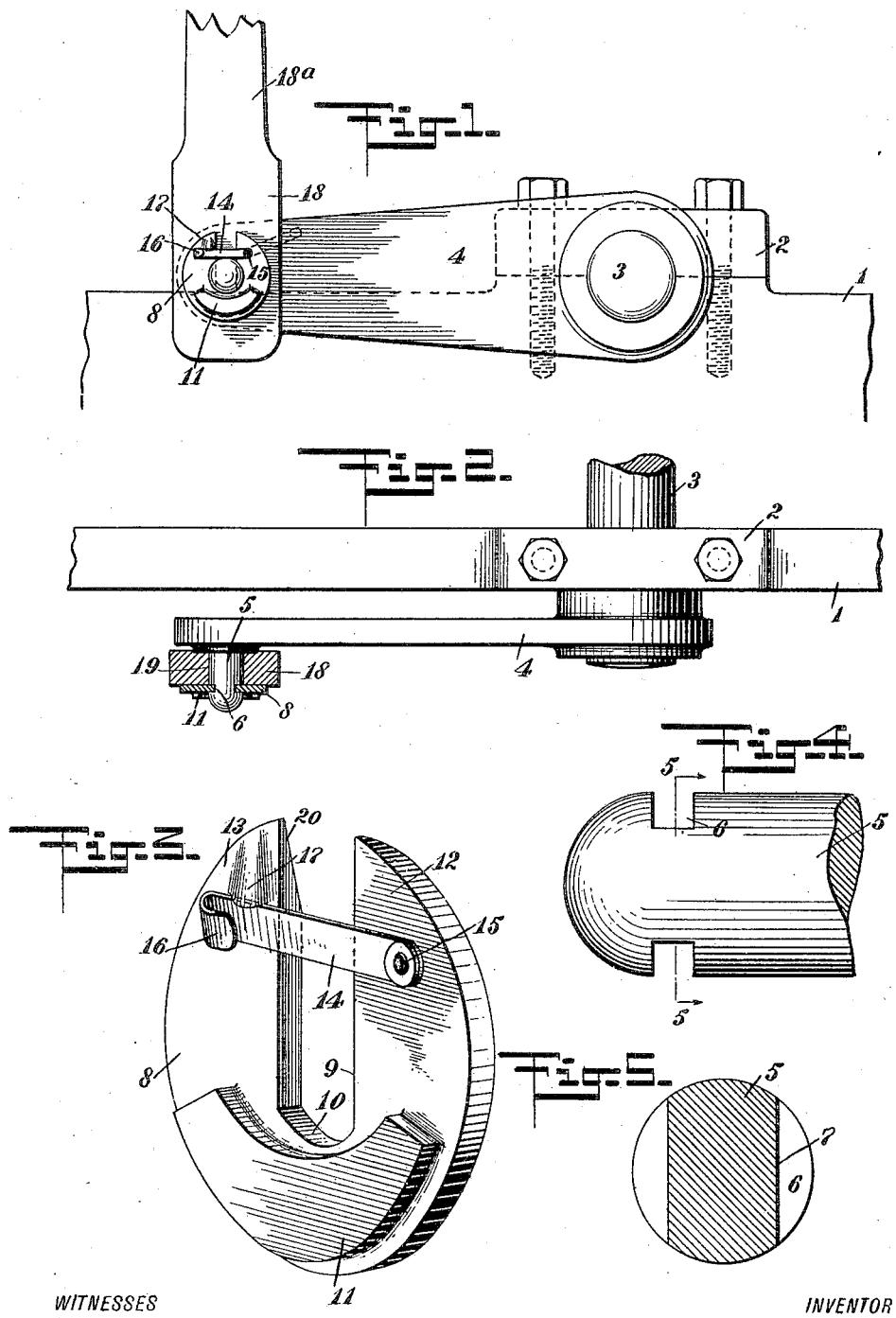
WITNESSES
INVENTOR
John F. Keith
BY
ATTORNEYS

UNITED STATES PATENT OFFICE.

JOHN FREDERIC KEITH, OF NAPLES, NEW YORK.

CRANK-PIN CONNECTION FOR WELL-DRILLING MACHINERY.

971,897.  Specification of Letters Patent.  Patented Oct. 4, 1910.

Application filed May 19, 1909. Serial No. 496,882.

*To all whom it may concern:*

Be it known that I, JOHN FREDERIC KEITH, a citizen of the United States, and a resident of Naples, in the county of Ontario and State of New York, have invented a new and Improved Crank-Pin Connection for Well-Drilling Machinery, of which the following a full, clear, and exact description.

This invention relates to the driving mechanism for drills such as used for drilling oil wells, or for similar purposes.

The object of the invention is to produce an improved form of connection between the pitman or connecting rod and the crank, and while the invention is especially applicable when used with the mechanism suggested, it is capable of use in machinery of other classes.

A further object of the invention is to provide a simple arrangement for holding the pitman on the crank pin so as to prevent its slipping off as the crank rotates, and, further, to provide such a construction as will enable the pitman or connecting rod to be readily disengaged when desired.

The invention consists in the construction and combination of parts to be more fully described hereinafter and particularly set forth in the claim.

Reference is to be had to the accompanying drawings forming a part of this specification, in which similar characters of reference indicate corresponding parts in all the figures.

Figure 1 is a side elevation showing a portion of a machine frame in which a driven shaft is rotatably mounted in a suitable bearing, and showing the connection with the connecting rod or pitman; Fig. 2 is a plan of the part shown in Fig. 1, except that the pitman or connecting rod head is shown in cross section at its point of connection with the crank pin; Fig. 3 is a perspective of the connecting plate by means of which the connection is made; Fig. 4 is an elevation upon an enlarged scale, showing the form of the end of the crank pin; and Fig. 5 is a cross section through the crank pin taken on the line 5—5 of Fig. 4.

Referring more particularly to the parts, 1 represents a portion of the frame, in which a bearing 2 is provided for a driven shaft 3. This shaft is provided with a rigid crank 4, said crank having a pin 5 near its outer extremity. In applying my invention, I provide the end of the pin with oppositely disposed slots 6 which are preferably of rectangular form, as shown. These slots are disposed parallel with each other so that at the point where they are located, they form flat cheeks 7 on the sides of the pin, said cheeks being depressed into the interior of the pin, as indicated in Fig. 5. I also provide a locking plate 8 which has the form of a disk, and this plate is provided with a deep slot 9 which extends in from one edge thereof to a point beyond the center. The inner end of this slot is formed with a curved edge 10 which is adapted to seat against the rounded side of the crank pin. The side of the disk remote from the opening of the slot may be considered as the butt end of the locking plate, and at this point, a laterally projecting integral driving boss or lug 11 is formed which may be struck to drive the plate home. By reason of the slot 9 which partially divides the disk, the disk or locking plate presents two horns, 12 and 13. To the horn 12 a spring latch 14 is attached by a pivot pin 15. The outer end of this latch is bent up so as to form a handle 16 for operating the latch. On the outer side of the horn 13 and opposite to the pivot pin 15, an upwardly projecting tooth 17 is formed, which is slightly under-cut, as indicated, so that it may engage the edge of the latch and retain the same.

In attaching the head 18 of the connecting rod or pitman 18ª to the crank 4, the head 18 is provided with an opening 19 of substantially the same diameter as the pin 5. This opening is applied to the pin in the manner indicated in Fig. 2, and the locking plate 8 is then slid transversely of the pin so that the side edges of the slot 9 engage the cheeks 7 of the grooves or channels 6. In order to facilitate the insertion of the locking plate in this manner, its horns 12 and 13 are slightly beveled, that is, they are provided on their inner sides with inclined faces 20, as indicated in Fig. 3. The locking disk may be driven home so that the curved edge 10 seats against the curved edge of the pin. After the locking plate has been seated in this manner, the latch 14 is forced against the side of the pin and so that its edge remote from the pin slips over the inclined tooth 17 and engages the tooth in the manner indicated. In this way the tooth will retain the latch 14, which acts as a bar to prevent the plate from being withdrawn. In this connection it should be noted that the inner edge of the latch rests against the curved side face of the pin opposite to the seating point of the edge 10 of the slot. When it is desired to disengage the connecting rod, the latch may be disengaged and drawn back, as indicated by the dotted lines in Fig. 1, whereupon the plate can be driven out of connection with the pin.

Having thus described my invention, I claim as new and desire to secure by Letters Patent,—

A crank having a pin provided with oppositely arranged transverse grooves, and a disk having a radial slot, the inner end of the slot being rounded to fit the periphery of the pin, and the side walls of the slot seating in the grooves, said disk having on one face an integral laterally extending boss for the purpose specified, and a spring latch pivoted to the face of the disk on one side of the slot, the opposite side having an integral tooth for engagement by the latch, the engaging face of the tooth being undercut.

In testimony whereof I have signed my name to this specification in the presence of two subscribing witnesses.

JOHN FREDERIC KEITH.

Witnesses:
CHARLES KEITH,
E. E. KEITH.